US012665784B2

(12) United States Patent
Kikuchi et al.

(10) Patent No.: US 12,665,784 B2
(45) Date of Patent: Jun. 23, 2026

(54) VEHICLE-MOUNTED CONTROL DEVICE, ETHERNET SWITCH AND DEVICE SETTING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yoshitaka Kikuchi, Yokkaichi (JP); Takeshi Hagihara, Yokkaichi (JP); Hirofumi Urayama, Yokkaichi (JP); Darmawan Go, Yokkaichi (JP); Tomohiro Otsu, Yokkaichi (JP); Hideyuki Tanaka, Osaka (JP); Tatsuya Izumi, Osaka (JP); Yusuke Yamamoto, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 249 days.

(21) Appl. No.: 18/566,480

(22) PCT Filed: Jun. 6, 2022

(86) PCT No.: PCT/JP2022/022770
§ 371 (c)(1),
(2) Date: Dec. 1, 2023

(87) PCT Pub. No.: WO2022/264848
PCT Pub. Date: Dec. 22, 2022

(65) Prior Publication Data
US 2024/0250845 A1      Jul. 25, 2024

(30) Foreign Application Priority Data

Jun. 15, 2021    (JP) ................................. 2021-099308

(51) Int. Cl.
H04L 12/46          (2006.01)
B60R 16/023         (2006.01)
(52) U.S. Cl.
CPC ............ H04L 12/46 (2013.01); B60R 16/023 (2013.01)
(58) Field of Classification Search
CPC ..................... H04L 12/46; H04L 12/12; H04L 2012/40215; H04L 2012/40273; B60R 16/023
See application file for complete search history.

(56) References Cited

U.S. PATENT DOCUMENTS 10,103,938 B1 *   10/2018   Samii .................... H04L 49/351
11,237,570 B2 *    2/2022   Ayers ................... G07C 5/0808
(Continued)

FOREIGN PATENT DOCUMENTS

JP        2007-065856 A        3/2007
JP        2011-040912 A        2/2011
JP        2011-070287 A        4/2011

OTHER PUBLICATIONS

International Search Report for PCT JP2022/022770.

*Primary Examiner* — Richard M Camby
(74) *Attorney, Agent, or Firm* — Brooks Kushman P.C.

(57)            ABSTRACT

A vehicle-mounted control device to be mounted in a vehicle, includes: an acquisition unit configured to acquire calculation information to be used to calculate a setting change timing of a vehicle-mounted network from an electronic device in the vehicle-mounted network; a calculation unit configured to calculate the setting change timing based on the calculation information acquired by the acquisition (Continued)

unit; and a control unit configured to perform processing for executing a setting change of the vehicle-mounted network at the setting change timing calculated by the calculation unit, wherein the calculation information includes at least one of a topology of the vehicle-mounted network, a service of a system to which the electronic device belongs, a travel state of the vehicle, and a power supply state of the vehicle.

5 Claims, 10 Drawing Sheets

(56)               References Cited

U.S. PATENT DOCUMENTS

| | | | |
|---|---|---|---|
| 12,362,962 B2 * | 7/2025 | Beier | H04L 47/72 |
| 2016/0016523 A1 * | 1/2016 | Yousefi | H04W 72/56 |
| | | | 370/401 |
| 2016/0264071 A1 | 9/2016 | Ujiie et al. | |
| 2018/0198545 A1 * | 7/2018 | Aichriedler | H04Q 9/04 |
| 2021/0400452 A1 | 12/2021 | Baba et al. | |
| 2022/0158900 A1 | 5/2022 | Yamamoto et al. | |
| 2023/0021603 A1 * | 1/2023 | Ichimaru | B60R 16/023 |
| 2024/0305524 A1 * | 9/2024 | Go | B60R 16/023 |

* cited by examiner

FIG. 4

| SYSTEM<br><br>SETTING CHANGE CONDITION | ADAS | IVI |
|---|---|---|
| VEHICLE BEHAVIOR (STATE) | IF ACC IS ON:<br>  ·NO RESTRICTION<br>IF IG IS ON:<br>  ·STOPPED | IF ACC OR IG IS ON:<br>·SERVICE IS STOPPED<br>(REGARDLESS OF TRAVEL) |
| BAND MARGIN | $\geqq$ X bps | $\geqq$ Y bps |

VEHICLE-MOUNTED CONTROL DEVICE, ETHERNET SWITCH AND DEVICE SETTING METHOD

CROSS-REFERENCE TO RELATED APPLICATIONS

This application is the U.S. national stage of JP2022/022770 filed Jun. 6, 2022, which claims priority of Japanese Patent Application No. JP 2021-099308 filed on Jun. 15, 2021, the contents of which are incorporated herein.

TECHNICAL FIELD

The present disclosure relates to a vehicle-mounted control device, an Ethernet switch, and a device setting method.

BACKGROUND

JP 2014-79093A (International Publication No. 2020/145334) discloses the following technique. That is, a vehicle control device controls a plurality of relay devices based on a control scenario in which a state of a vehicle inside of which a vehicle network made up of the plurality of relay devices is constructed and control content set for each of the plurality of relay devices are associated with each other.

When dynamically performing a setting change of a vehicle-mounted network, the setting change may affect communication in the vehicle-mounted network, depending on the environment of the vehicle and the like.

The present disclosure has been made to solve the above-described problems, and aims to provide a vehicle-mounted control device, an Ethernet switch, and a device setting method, according to which it is possible to realize stable communication in a vehicle-mounted network in a configuration in which a setting change of the vehicle-mounted network is possible.

SUMMARY

A vehicle-mounted control device according to the present disclosure is a vehicle-mounted control device to be mounted in a vehicle, including: an acquisition unit configured to acquire calculation information to be used to calculate a setting change timing of a vehicle-mounted network from an electronic device in the vehicle-mounted network; a calculation unit configured to calculate the setting change timing based on the calculation information acquired by the acquisition unit; and a control unit configured to perform processing for executing a setting change of the vehicle-mounted network at the setting change timing calculated by the calculation unit, wherein the calculation unit calculates the setting change timing based further on at least one of a timing when a function or service of a system that is a setting change target in the vehicle-mounted network can be stopped, a timing when a function or service of a system other than the system that is the setting change target in the vehicle-mounted network is not affected, and a timing when there is a band margin of a predetermined value or more in the vehicle-mounted network, the calculation information includes at least one of a topology of the vehicle-mounted network, a service of a system to which the electronic device belongs, a travel state of the vehicle, and a power supply state of the vehicle, and the calculation unit calculates a timing at which a setting change is possible for each of systems that provide different services, including the system that is the setting change target, and calculates the setting change timing based on each of the calculated timings.

An Ethernet switch according to the present disclosure is an Ethernet switch to be mounted in a vehicle, including: a relay unit configured to relay information between electronic devices in a vehicle-mounted network, wherein the relay unit acquires from an electronic device among the electronic devices or generates calculation information to be used to calculate a setting change timing of the vehicle-mounted network, and transmits the calculation information to another device that calculates the setting change timing, the Ethernet switch further includes a setting unit configured to receive a setting change request based on the setting change timing from the other device and perform a setting change of the relay unit according to the received setting change request, and the calculation information includes at least one of a topology of the vehicle-mounted network, a service of a system to which the electronic device belongs, a travel state of the vehicle, and a power supply state of the vehicle.

A device setting method according to the present disclosure is a device setting method in a vehicle-mounted control device to be mounted in a vehicle, including: a step of acquiring calculation information to be used to calculate a setting change timing of a vehicle-mounted network from an electronic device in the vehicle-mounted network; a step of calculating the setting change timing based on the acquired calculation information; and a step of performing processing for executing a setting change of the vehicle-mounted network at the calculated setting change timing, wherein in the step of calculating the setting change timing, the setting change timing is calculated based further on at least one of a timing when a function or service of a system that is a setting change target in the vehicle-mounted network can be stopped, a timing when a function or a service of a system other than the system that is the setting change target in the vehicle-mounted network is not affected, and a timing when there is a band margin of a predetermined value or more in the vehicle-mounted network, the calculation information includes at least one of a topology of the vehicle-mounted network, a service of a system to which the electronic device belongs, a travel state of the vehicle, and a power supply state of the vehicle, and in the step of calculating the setting change timing, a timing at which a setting change is possible is calculated for each of systems that provide different services, including the system that is the setting change target, and the setting change timing is calculated based on each of the calculated timings.

A device setting method according to the present disclosure is a device setting method for an Ethernet switch to be mounted in a vehicle and including a relay unit configured to relay information between electronic devices in a vehicle-mounted network, including: a step of acquiring from an electronic device among the electronic devices or generating calculation information to be used to calculate the setting change timing of the vehicle-mounted network and transmitting the calculation information to another device that calculates the setting change timing; and a step of receiving a setting change request based on the setting change timing from the other device, and performing a setting change of the relay unit according to the received setting change request, wherein the calculation information includes at least one of a topology of the vehicle-mounted network, a service of a system to which the electronic device belongs, a travel state of the vehicle, and a power supply state of the vehicle.

One aspect of the present disclosure can be realized not only as a vehicle-mounted control device that includes such characteristic processing units, but also as a program for enabling a computer to carry out such characteristic processing steps. Also, one aspect of the present disclosure can be realized as a semiconductor integrated circuit that realizes a part or the entirety of the vehicle-mounted control device, or can be realized as a system that includes the vehicle-mounted control device.

One aspect of the present disclosure can be realized not only as an Ethernet switch that includes such characteristic processing units, but also as a program for enabling a computer to carry out such characteristic processing steps. Also, one aspect of the present disclosure can be realized as a semiconductor integrated circuit that realizes a part or the entirety of the Ethernet switch, or can be realized as a system that includes the Ethernet switch.

Effects of the Present Disclosure

With the present disclosure, in a configuration in which a setting change of the vehicle-mounted network is possible, stable communication can be realized in the vehicle-mounted network.

BRIEF DESCRIPTION OF THE DRAWINGS

FIG. 4 is a diagram showing an example of a condition table in the vehicle-mounted control device according to the embodiment of the present disclosure.

Figure 1:
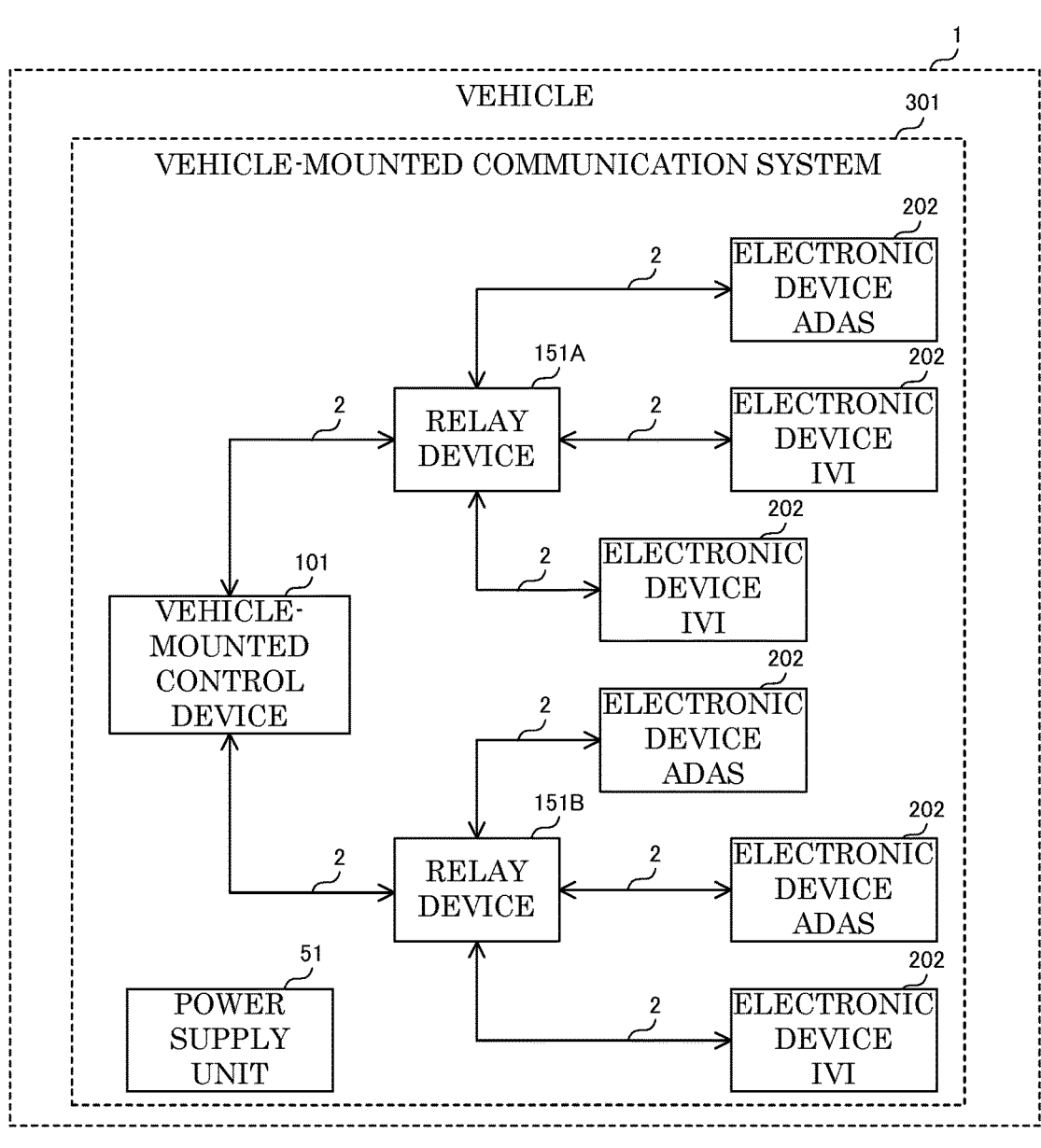
FIG. 1 is a diagram showing a configuration of a vehicle-mounted communication system according to an embodiment of the present disclosure.

A technique for performing a setting change of a configuration of a vehicle-mounted network has been developed.

First, the details of an embodiment of the present disclosure are listed and described.

(1) A vehicle-mounted control device according to an embodiment of the present disclosure is a vehicle-mounted control device to be mounted in a vehicle, including: an acquisition unit configured to acquire calculation information to be used to calculate a setting change timing of a vehicle-mounted network from an electronic device in the vehicle-mounted network; a calculation unit configured to calculate the setting change timing based on the calculation information acquired by the acquisition unit; and a control unit configured to perform processing for executing a setting change of the vehicle-mounted network at the setting change timing calculated by the calculation unit, wherein the calculation unit calculates the setting change timing based further on at least one of a timing when a function or service of a system that is a setting change target in the vehicle-mounted network can be stopped, a timing when a function or service of a system other than the system that is the setting change target in the vehicle-mounted network is not affected, and a timing when there is a band margin of a predetermined value or more in the vehicle-mounted network, the calculation information includes at least one of a topology of the vehicle-mounted network, a service of a system to which the electronic device belongs, a travel state of the vehicle, and a power supply state of the vehicle, and the calculation unit calculates a timing at which a setting change is possible for each of systems that provide different services, including the system that is the setting change target, and calculates the setting change timing based on each of the calculated timings.

Such a configuration makes it possible to calculate an appropriate setting change timing using the calculation information acquired from the electronic device in the vehicle-mounted network, and therefore, when dynamically performing a setting change of the vehicle-mounted network, it is possible to reduce the likelihood that a setting change will affect communication in the in-vehicle network, with consideration given to high priority communication and the communication load. Accordingly, in a configuration in which a setting change of the vehicle-mounted network is possible, stable communication can be realized in the vehicle-mounted network.

The calculation unit may also calculate the setting change timing based on a timing when a function or a service of a system that is a setting change target in the vehicle-mounted network can be stopped.

With such a configuration, it is possible to realize more stable communication, particularly in a system that is a setting change target, before and after the setting change of the vehicle-mounted network.

The calculation unit may also calculate the setting change timing based on a timing when a function or a service of a system other than the system that is the setting change target in the vehicle-mounted network is not affected.

With such a configuration, it is possible to realize more stable communication, particularly in a system other than the system that is the setting change target, before and after the setting change of the vehicle-mounted network.

The calculation unit may calculate the setting change timing based on a timing when there is a band margin of a predetermined value or more in the vehicle-mounted network.

With such a configuration, it is possible to calculate an appropriate setting change timing with consideration given particularly to the state of communication traffic in the vehicle-mounted network, before and after a setting change of the vehicle-mounted network.

The calculation information may also include a topology of the vehicle-mounted network.

With such a configuration, it is possible to calculate an appropriate setting change timing with consideration given particularly to the device configuration in the vehicle-mounted network, when performing a setting change of the vehicle-mounted network.

The calculation information may also include a service of a system to which the electronic device belongs.

With such a configuration, it is possible to calculate an appropriate setting change timing with consideration given particularly to various services provided in the vehicle-mounted network, when performing a setting change of the vehicle-mounted network.

The calculation information may also include a travel state of the vehicle.

With such a configuration, it is possible to calculate an appropriate setting change timing with consideration given particularly to the travel state of the vehicle, when performing a setting change of the vehicle-mounted network. For example, if high-priority communication is being performed or the communication load is high due to automatic driving, it is possible to appropriately determine whether or not to implement a setting change of the vehicle-mounted network.

The calculation information may also include a power supply state of the vehicle.

With such a configuration, it is possible to calculate an appropriate setting change timing with consideration given particularly to the power supply state and type of power supply in the vehicle, when performing a setting change of the vehicle-mounted network.

The calculation unit may also calculate a timing when a setting change is possible for each of systems that provide different services, including the system that is the setting change target, and may calculate the setting change timing based on each of the calculated timings.

With such a configuration, when changing the setting of the vehicle-mounted network, it is possible to comprehensively determine the appropriate setting change timing with consideration given to the state and conditions of each service provided in the vehicle-mounted network when performing a setting change of the vehicle-mounted network, and to realize smoother provision of each service.

(2) A configuration is possible in which, the acquisition unit acquires the calculation information via a relay device configured to relay information between the electronic devices in the vehicle-mounted network, the calculation unit calculates setting change content of the relay device and the setting change timing of the relay device based on the calculation information, and as the processing, the control unit performs processing for reflecting the setting change content in the relay device at the setting change timing.

Such a configuration makes it possible to determine more appropriate setting change content and a more appropriate setting change timing for relay processing that greatly affects communication in a vehicle-mounted network, and to realize smoother communication before and after a setting change in the vehicle-mounted network.

(3) An Ethernet switch according to an embodiment of the present disclosure is an Ethernet switch to be mounted in a vehicle, including: a relay unit configured to relay information between electronic devices in a vehicle-mounted network, wherein the relay unit acquires from an electronic device among the electronic devices or generates calculation information to be used to calculate a setting change timing of the vehicle-mounted network, and transmits the calculation information to another device that calculates the setting change timing, the Ethernet switch further includes a setting unit configured to receive a setting change request based on the setting change timing from the other device and perform a setting change of the relay unit according to the received setting change request, and the calculation information includes at least one of a topology of the vehicle-mounted network, a service of a system to which the electronic device belongs, a travel state of the vehicle, and a power supply state of the vehicle.

Such a configuration makes it possible to calculate an appropriate setting change timing using the calculation information acquired from the electronic device in the vehicle-mounted network, and therefore, when dynamically performing a setting change of the vehicle-mounted network, it is possible to reduce the likelihood that a setting change will affect communication in the in-vehicle network, with consideration given to high priority communication and the communication load. Also, it is possible to determine more appropriate setting change content and a more appropriate setting change timing for relay processing that greatly affects communication in the vehicle-mounted network, and to realize smoother communication before and after a setting change in the vehicle-mounted network. Accordingly, in a configuration in which a setting change of the vehicle-mounted network is possible, stable communication can be realized in the vehicle-mounted network.

(4) A device setting method according to an embodiment of the present disclosure is a device setting method in a vehicle-mounted control device to be mounted in a vehicle, including: a step of acquiring calculation information to be used to calculate a setting change timing of a vehicle-mounted network from an electronic device in the vehicle-mounted network; a step of calculating the setting change timing based on the acquired calculation information; and a step of performing processing for executing a setting change of the vehicle-mounted network at the calculated setting change timing, wherein in the step of calculating the setting change timing, the setting change timing is calculated based further on at least one of a timing when a function or service of a system that is a setting change target in the vehicle-mounted network can be stopped, a timing when a function or a service of a system other than the system that is the setting change target in the vehicle-mounted network is not affected, and a timing when there is a band margin of a predetermined value or more in the vehicle-mounted network, the calculation information includes at least one of a topology of the vehicle-mounted network, a service of a system to which the electronic device belongs, a travel state of the vehicle, and a power supply state of the vehicle, and in the step of calculating the setting change timing, a timing at which a setting change is possible is calculated for each of systems that provide different services, including the system that is the setting change target, and the setting change timing is calculated based on each of the calculated timings.

Such a method makes it possible to calculate an appropriate setting change timing using the calculation information acquired from the electronic device in the vehicle-mounted network, and therefore, when dynamically performing a setting change of the vehicle-mounted network, it is possible to reduce the likelihood that a setting change will affect communication in the in-vehicle network, with consideration given to high-priority communication and the communication load. Accordingly, in a configuration in which a setting change of the vehicle-mounted network is possible, stable communication can be realized in the vehicle-mounted network.

(5) A device setting method according to an embodiment of the present disclosure is a device setting method for an Ethernet switch to be mounted in a vehicle and including a relay unit configured to relay information between electronic devices in a vehicle-mounted network, including: a step of acquiring from an electronic device among the electronic devices or generating calculation information to be used to calculate the setting change timing of the vehicle-mounted network and transmitting the calculation information to another device that calculates the setting change timing; and a step of receiving a setting change request based on the setting change timing from the other device, and performing a setting change of the relay unit according to the received setting change request, wherein the calculation information includes at least one of a topology of the vehicle-mounted network, a service of a system to which the electronic device belongs, a travel state of the vehicle, and a power supply state of the vehicle.

Such a method makes it possible to calculate an appropriate setting change timing using the calculation information acquired from the electronic device in the vehicle-mounted network, and therefore, when dynamically performing a setting change of the vehicle-mounted network, it is possible to reduce the likelihood that a setting change will affect communication in the in-vehicle network, with consideration given to high priority communication and the communication load. Also, it is possible to determine more appropriate setting change content and a more appropriate setting change timing for relay processing that greatly affects communication in the vehicle-mounted network, and to realize smoother communication before and after a setting change in the vehicle-mounted network. Accordingly, in a configuration in which a setting change of the vehicle-mounted network is possible, stable communication can be realized in the vehicle-mounted network.

Hereinafter, embodiments of the present disclosure will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

FIG. 1 is a diagram showing a configuration of a vehicle-mounted communication system according to an embodiment of the present disclosure. With reference to FIG. 1, a vehicle-mounted communication system 301 is mounted in a vehicle 1 and includes a vehicle-mounted control device 101, relay devices 151A and 151B, six electronic devices 202, and a power supply unit 51. The relay devices 151A and 151B will also be referred to as relay devices 151 hereinafter. The relay devices 151 are examples of electronic devices.

Note that the vehicle-mounted communication system 301 is not limited to a configuration including one vehicle-mounted control device 101, and may also have a configuration including two or more vehicle-mounted control devices 101. Also, the vehicle-mounted communication system 301 is not limited to a configuration including two relay devices 151, and may also have a configuration including one or three or more relay devices 151. Also, the vehicle-mounted communication system 301 is not limited to a configuration including six electronic devices 202, and may also have a configuration including five or fewer, or seven or more electronic devices 202.

The vehicle-mounted control device 101 is connected to the relay devices 151A and 151B via two cables 2, respectively. The relay device 151A is connected to three electronic devices 202 via three cables 2, respectively. The relay device 151B is connected to three electronic devices 202 via three cables 2, respectively. The cables 2 are, for example, Ethernet (registered trademark) cables. The relay devices 151 are, for example, Ethernet switches. The vehicle-mounted control device 101, the relay devices 151, the electronic devices 202, and the cables 2 constitute a vehicle-mounted network.

The electronic devices 202 are, for example, vehicle-mounted devices such as ECUs (Electronic Control Units).

Specifically, each of the electronic devices 202 is, for example, a driving assistance device that gives instructions to various devices in a driving assistance system (Advanced Driver-Assistance System: ADAS), or the like. Also, each of the electronic devices 202 is, for example, an electric power steering (EPS), a brake control device, an accelerator control device, or a steering control device, which are examples of the various devices described above, or a sensor or the like that provides measurement information to the driving assistance device.

Also, each of the electronic devices 202 is, for example, a car navigation device, a display, car audio, or the like in an IVI (In-Vehicle Infotainment) system. Note that, as devices constituting the IVI system, the electronic devices 202 may be devices that the user brings into the vehicle 1, such as a portable terminal such as a tablet, or a USB (Universal Serial Bus) memory.

Also, the electronic devices 202 are not limited to devices that constitute the ADAS and IVI systems, and may be devices for other uses.

In the vehicle-mounted communication system 301 shown in FIG. 1, electronic devices 202 belonging to different systems are connected to common relay devices 151. More specifically, one ADAS electronic device 202 and two IVI electronic devices 202 are connected to the relay device 151A, and two ADAS electronic devices 202 and one IVI electronic device 202 are connected to the relay device 151B.

The relay devices 151 perform processing for relaying information between the plurality of electronic devices 202 in the vehicle-mounted network. More specifically, the relay devices 151 receive Ethernet frames in which various types of information from the electronic devices 202 are stored, and transmit the received Ethernet frames to the electronic devices 202 that are destinations, directly or via another device.

Also, the relay devices 151 perform processing for relaying information between the electronic devices 202 and the vehicle-mounted control device 101. More specifically, the relay devices 151 receive Ethernet frames in which various types of information are stored from the electronic devices 202, and transmit the received Ethernet frames to the vehicle-mounted control device 101. Also, the relay devices 151 receive Ethernet frames in which various types of information are stored from the vehicle-mounted control device 101, and transmit the received Ethernet frames to the electronic devices 202 that are destinations, directly or via another device.

The vehicle-mounted control device 101 performs a setting change of the vehicle-mounted network. More specifically, accompanying updating of software of the electronic devices 202 using OTA (Over The Air), addition of a new electronic device 202 to the vehicle-mounted network, or the like, the vehicle-mounted control device 101 generates setting information for changing a setting of relay processing performed by a relay device 151, for example, and transmits an Ethernet frame in which the generated setting information is stored to the relay device 151 that is the destination. The relay device 151 acquires the setting information from the received Ethernet frame, and changes its own relay processing setting based on the acquired setting information.

Note that, for example, it is possible to use a configuration in which the vehicle-mounted control device 101 is directly connected to a plurality of electronic devices 202 (not shown), and performs processing for relaying information between the electronic devices 202 in the same manner as the relay devices 151. In this case, the vehicle-mounted control device 101 generates setting information for changing the setting of its own relay processing, and changes the setting of its own relay processing based on the generated setting information.

The power supply unit 51 supplies power to the vehicle-mounted control device 101, the relay devices 151, the electronic devices 202, and the like. For example, the power supply unit 51 includes a plurality of types of power supplies, such as a constant power supply, an ignition power supply, and an accessory power supply. The power supply unit 51 supplies power of the corresponding type of power supply to the electronic devices 202 and the like.

Specifically, for example, the power supply unit 51 supplies power of an ignition power supply to the ADAS electronic devices 202 and supplies power of an ignition power supply and an accessory power supply to the IVI system electronic devices 202.

Figure 2:
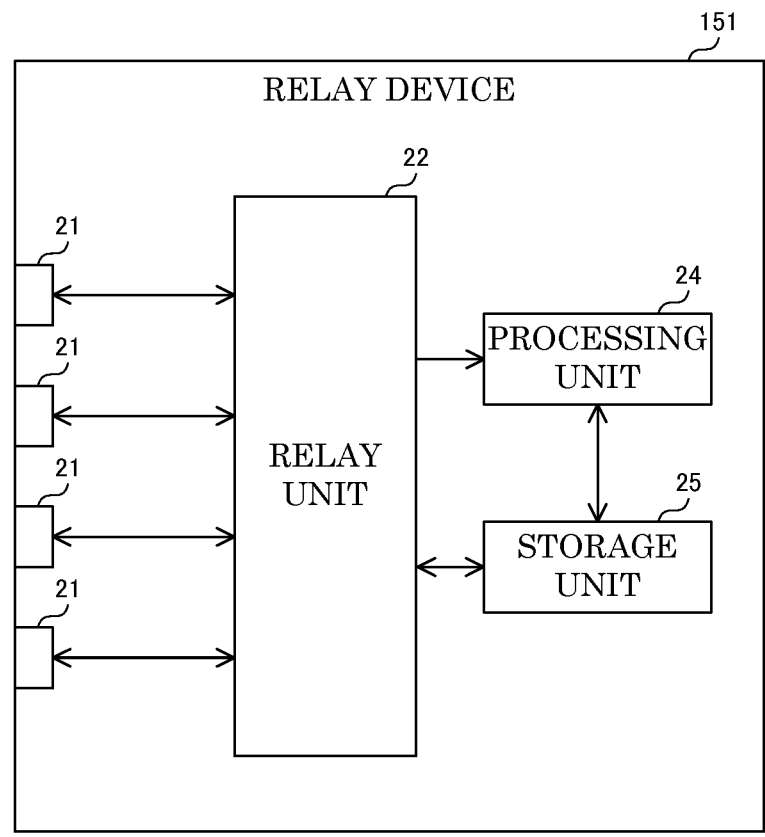
FIG. 2 is a diagram showing a configuration of a relay device according to an embodiment of the present disclosure.

FIG. 2 is a diagram showing a configuration of a relay device according to an embodiment of the present disclosure. With reference to FIG. 2, the relay device 151 includes four communication ports 21, a relay unit 22, a processing unit 24, and a storage unit 25. The processing unit 24 is an example of a setting unit. Note that the relay device 151 is not limited to the configuration including four communication ports 21, and may also have a configuration including two, three, or five or more communication ports 21.

The communication ports 21 are terminals to which the cables 2 can be connected, for example. Note that the communication ports 21 may also be terminals of integrated circuits. The four communication ports 21 are connected to the vehicle-mounted control device 101 or the electronic devices 202 via the cables 2.

The processing unit 24 is realized by, for example, processors such as a CPU (Central Processing Unit) and a DSP (Digital Signal Processor). The relay unit 22 is implemented by, for example, an L2 switch IC and a processor. The storage unit 25 is, for example, a non-volatile memory.

The relay unit 22 performs processing for relaying information between the plurality of electronic devices 202 in the vehicle-mounted network. That is, the relay unit 22 receives Ethernet frames transmitted from the electronic devices 202 via the communication ports 21, and performs relay processing on the received Ethernet frames. For example, the relay unit 22 can function as an L2 switch, and performs relay processing on an Ethernet frame transmitted between the electronic devices 202 connected to the relay device 151 in which the relay unit 22 is included. Note that the relay unit 22 can function as an L3 switch, and may be configured to perform relay processing on an Ethernet frame transmitted between electronic devices 202 connected to a different relay device 151.

Similarly, the relay unit 22 performs processing for relaying information between the vehicle-mounted control device 101 and the electronic devices 202 in the vehicle-mounted network. That is, the relay unit 22 receives Ethernet frames transmitted from the vehicle-mounted control device 101 or the electronic devices 202 via the communication ports 21, and performs relay processing on the received Ethernet frames.

The relay unit 22 performs the above-described relay processing by referring to various tables stored in the storage unit 25, for example.

The relay unit 22 acquires from the electronic device 202 or generates calculation information to be used to calculate the setting change timing of the vehicle-mounted network, and transmits the calculation information to another device that calculates the setting change timing.

More specifically, the relay unit 22 receives an Ethernet frame from an electronic device 202 via a corresponding communication port 21, and acquires calculation information from the received Ethernet frame. The relay unit 22 transmits the generated or acquired calculation information to the vehicle-mounted control device 101 via the corresponding communication port 21.

As an example, the calculation information includes a topology of the vehicle-mounted network. As another example, the calculation information may also include a service of a system to which the electronic device 202 belongs. As another example, the calculation information may also include a travel state of the vehicle 1. As another example, the calculation information may also include a power supply state of the vehicle 1. Also, the calculation information may include a plurality or all of these pieces of information.

Specifically, for example, the calculation information provided by the electronic device 202 includes the travel state of the vehicle 1, such as being stopped and traveling, the power supply state of the vehicle 1, such as the ignition power supply and the accessory power supply, information on a service provided by the electronic device 202, the system to which the electronic device 202 belongs, and the like.

Also, for example, the calculation information provided by the relay device 151 includes, for example, a band margin of each communication port. As a result, communication traffic in the vehicle-mounted network can be determined more appropriately using information on the communication path of the relay device 151 where communication congestion is likely to occur.

As a method for transmitting the calculation information, for example, the calculation information is stored in service information, or more specifically, an option area of a message in SD (Service Discovery) of SOME/IP (Scalable service-Oriented MiddlewarE over IP). For example, according to the information of the message, it is possible to find out the system to which the device that is the transmission source belongs.

Also, for example, the calculation information is stored in topology information, or more specifically, in an extension area of an LLDP (Link Layer Discovery Protocol) frame, or in an extension MIB (Management Information Base) area of an SNMP (Simple Network Management Protocol) packet.

Note that the calculation information may also be stored in a dedicated frame and transmitted to the vehicle-mounted control device 101, for example.

Figure 3:
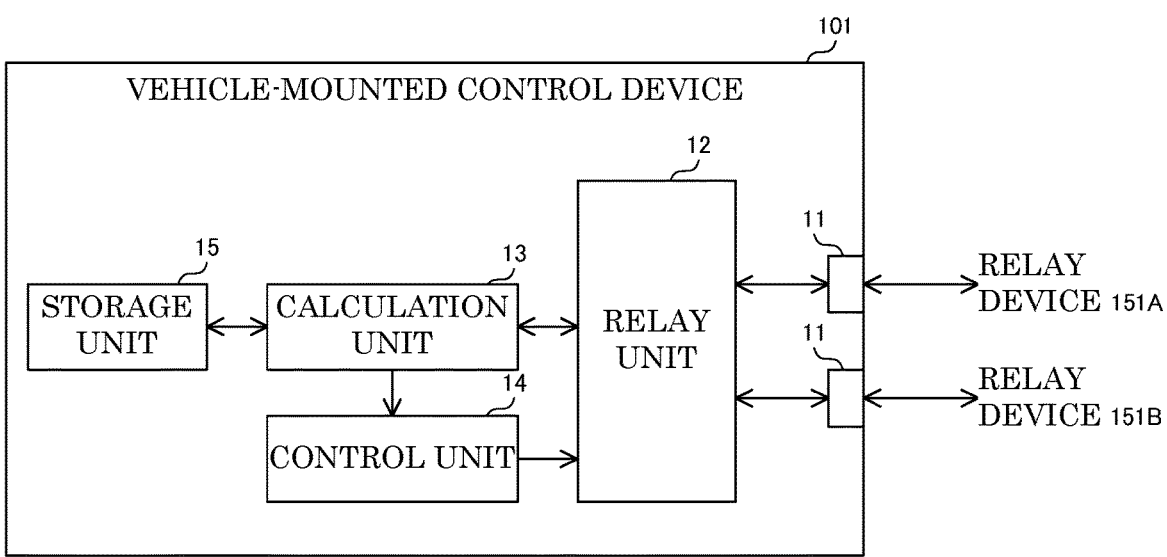
FIG. 3 is a diagram showing a configuration of a vehicle-mounted control device according to an embodiment of the present disclosure.

FIG. 3 is a diagram showing a configuration of a vehicle-mounted control device according to an embodiment of the present disclosure. With reference to FIG. 3, the vehicle-mounted control device 101 includes two communication ports 11, a relay unit 12, a calculation unit 13, a control unit 14, and a storage unit 15. The relay unit 12 is an example of an acquisition unit. Note that the vehicle-mounted control device 101 is not limited to a configuration including two communication ports 11, and may also have a configuration including one or three or more communication ports 11.

The communication ports 11 are, for example, terminals to which the cables 2 can be connected. Note that the communication ports 11 may also be terminals of integrated circuits. For example, two communication ports 11 are connected to the relay devices 151A and 151B via the cables 2, respectively.

The calculation unit 13 and the control unit 14 are realized by processors such as a CPU and a DSP, for example. The relay unit 12 is realized by, for example, an L2 switch IC and a processor. The storage unit 15 is, for example, a non-volatile memory.

The relay unit 12 acquires calculation information used for calculating the setting change timing of the vehicle-mounted network from the electronic devices 202 and the relay devices 151 in the vehicle-mounted network.

For example, the relay unit 12 acquires calculation information from the electronic devices 202 via the relay devices 151 that relay information between the electronic devices 202 in the vehicle-mounted network, or acquires calculation information generated by the relay devices 151.

More specifically, the relay unit 12 receives Ethernet frames from the relay devices 151 via the communication ports 11, and acquires calculation information from the received Ethernet frames. The relay unit 12 outputs the acquired calculation information to the calculation unit 13.

Note that the relay unit 12 is not limited to the configuration in which the calculation information is acquired from both the electronic devices 202 and the relay devices 151, and may have a configuration in which the calculation information is acquired from either the electronic devices 202 or the relay devices 151, or a configuration in which the calculation information is acquired from an electronic device 202 (not shown) that is directly connected to the vehicle-mounted control device 101 in which the relay unit 12 is included.

The calculation unit 13 calculates setting change content and a setting change timing of the relay devices 151 and the like based on at least the calculation information.

For example, the calculation unit 13 calculates the setting change content of the relay devices 151 and the like based on various types of collected information, specifically topology information, service information, and the like.

More specifically, the calculation unit 13 calculates setting change content in which at least one of the setting content of relay processing performed by the relay devices 151 and the setting content of relay processing performed by the vehicle-mounted control device 101 in which the calculation unit 13 is included is changed, based on the various types of collected information. The setting change content includes, for example, filtering in relay processing, priority ranking of various frames in QoS (Quality of Service) control, and the like. Also, the setting change content includes whether or not there is a setting change, and is determined for each communication port in the relay devices 151 and the vehicle-mounted control device 101, for example.

Note that the calculation unit 13 may also have a configuration in which the setting change content of an electronic device or device other than the provision source of the various types of collected information is calculated.

Also, the calculation unit 13 calculates the setting change timing based on the calculation information acquired by the relay unit 12, and notifies the control unit 14 of the calculated setting change timing.

For example, the calculation unit 13 calculates the setting change timing based on the timing when a function or a service of the system that is the setting change target in the vehicle-mounted network can be stopped.

As another example, the calculation unit 13 calculates the setting change timing based on a timing when a function or a service of a system other than the system that is the setting change target in the vehicle-mounted network is not affected. For example, the calculation unit 13 calculates the setting change timing based on a timing when functions and services related to travel of the vehicle 1 are not affected.

As another example, the calculation unit 13 calculates the setting change timing based on a timing when there is a band margin of a predetermined value or more in the vehicle-mounted network.

Note that the calculation unit 13 may also be configured to comprehensively calculate the setting change timing based on a combination of some or all of the above timings.

FIG. 4 is a diagram showing an example of a condition table in the vehicle-mounted control device according to the embodiment of the present disclosure. With reference to FIG. 4, the storage unit 15 in the vehicle-mounted control device 101 stores a condition table indicating conditions under which a setting change is permitted for each system to which the electronic devices 202 belong. In the example of this condition table, a setting change of the electronic devices 202 is permitted if both a condition relating to the behavior, that is, the state of the vehicle, and a condition of the band margin are satisfied.

More specifically, in the ADAS, if the ignition power supply is on, services such as automatic driving run. For this reason, as the condition relating to the behavior, that is, the state of the vehicle, a setting change of the ADAS electronic devices 202 is allowed without any restriction regarding the behavior of the vehicle 1 if only the accessory power supply is on, and a setting change of the ADAS electronic devices 202 is allowed if the ignition power supply is on and if the vehicle 1 is stopped.

Furthermore, as the condition of the band margin, a setting change is allowed if a band margin of X bps (bits/second) or more is ensured between the vehicle-mounted control device 101 and the relay device 151.

On the other hand, in an IVI system, if the accessory power supply or the ignition power supply is on, the service will run. For this reason, as the condition regarding the behavior, that is, the state of the vehicle, a setting change of the IVI electronic devices 202 is allowed without any restriction regarding the travel of the vehicle 1 if the accessory power supply or the ignition power supply is on, and a setting change of the IVI electronic devices 202 is allowed if the service of the IVI system is stopped.

Furthermore, as the condition of the band margin, a setting change is allowed if a band margin of Y bps or more is ensured between the vehicle-mounted control device 101 and the relay devices 151. As an example, by setting X to a value greater than Y, for example, it is possible to make it less likely for the ADAS to be affected by a setting change of the vehicle-mounted network, compared to the IVI system.

For example, if the setting of the communication paths of the IVI electronic devices 202 is changed, it is necessary to determine the setting change timing such that settings of relay processing and the like for the IVI system are to be changed, whereas the service of the ADAS system that is not to be changed is not affected.

Specifically, for example, as described above, while the vehicle 1 is traveling, a setting change of the ADAS system is prohibited, and when a band of X bps or more is ensured between the vehicle-mounted control device 101 and the relay devices 151 while the ignition power supply is on and the vehicle 1 is stopped, the setting change timing is determined by the calculation unit 13, and a setting change of the vehicle-mounted network is implemented.

Note that the vehicle-mounted control device 101 is not limited to the configuration in which the condition table is stored in advance, that is, the configuration in which the conditions for the setting change timing are registered in advance, and may also have a configuration in which the setting change timing is determined by calculating the same content as the condition table using a learning model or the like.

Also, for example, the calculation unit 13 determines the system configuration as shown in FIG. 1 based on topology information serving as the calculation information. The calculation unit 13 calculates a setting change target and setting change content with consideration given to the determined system configuration. For example, the calculation unit 13 refers to the condition table and determines, based on the difference in the current band margin, that a setting change of the relay device 151A is possible, but a setting change of the relay device 151B is not possible, and after determining that the setting change target is the relay device 151A, calculates the setting change content and the setting change timing of the relay device 151A.

Also, if it is assumed that only a plurality of electronic devices 202 belonging to the same system A are connected to a certain relay device 151 in the vehicle-mounted communication system 301, the calculation unit 13 determines such a system configuration based on topology information serving as the calculation information. If the system A is the setting change target, the calculation unit 13 calculates the setting change timing based on a timing when a function or a service of the system A can be stopped, without giving consideration to a timing when a function or a service of a system other than the system A is not affected.

The control unit 14 changes at least one of settings for relay processing performed by the relay device 151 and settings for relay processing performed by the vehicle-mounted control device 101 in which the control unit 14 is included, for example, as the setting change of the vehicle-mounted network.

More specifically, the control unit 14 performs setting change request processing for executing a setting change of the vehicle-mounted network according to the above setting change content at the setting change timing notified from the calculation unit 13.

For example, as the above-described setting change request processing, the control unit 14 performs processing for reflecting the setting change content in the relay device 151 at the setting change timing.

With reference to FIG. 2 again, the processing unit 24 receives a setting change request based on the setting change timing from the vehicle-mounted control device 101, which is another device, via the relay unit 22, and performs a setting change of the relay unit 22 by, for example, updating the content of the above-described various tables in the storage unit 25 in accordance with the received setting change request.

The devices in the vehicle-mounted communication system according to an embodiment of the present disclosure each have a computer that includes a memory, and in each of such devices, an arithmetic processing unit such as a CPU in the computer reads out, from the memory, a program that includes part or all of the steps of the sequence described below, and executes the program. The programs executed by the devices can be installed from an external source. The programs executed by the devices are distributed in a state of being stored in recording media or distributed via a communication line.

Figure 5:
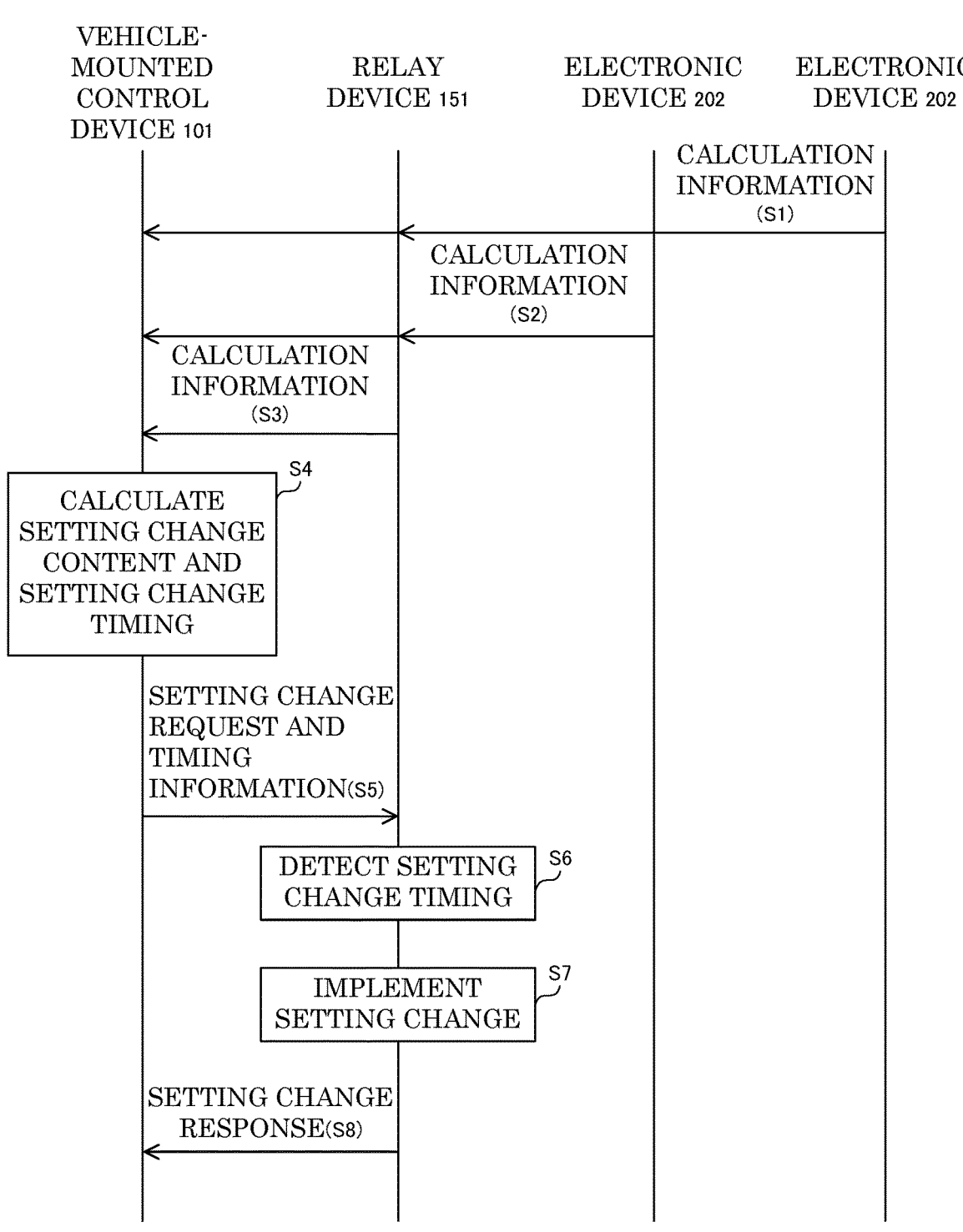
FIG. 5 is a diagram showing an example of a sequence of setting change processing in the vehicle-mounted communication system according to the embodiment of the present disclosure.

FIG. 5 is a diagram showing an example of a sequence of setting change processing in the vehicle-mounted communication system according to the embodiment of the present disclosure. FIG. 5 shows a case where two electronic devices 202 are connected to one relay device 151.

In the vehicle-mounted communication system 301, the relay device 151 receives from the electronic devices 202 or generates and transmits to the vehicle-mounted control device 101 the calculation information used for calculating the setting change timing of the vehicle-mounted network.

The vehicle-mounted control device 101 receives the calculation information and transmits a setting change request based on the setting change timing to the relay device 151.

Specifically, with reference to FIG. 5, first, each electronic device 202 periodically or irregularly generates calculation information and transmits the generated calculated information to the relay device 151. The relay device 151 transmits the calculation information received from each electronic device 202 to the vehicle-mounted control device 101 (steps S1 and S2).

Also, the relay device 151 periodically or irregularly generates calculation information and transmits the generated calculation information to the relay device 151 (step S3).

Here, the electronic devices 202 and the relay device 151 transmit to the relay device 151, for example, topology information, service information, and the like, together with calculation information.

Next, the vehicle-mounted control device 101 calculates the setting change content and the setting change timing of the relay device 151, for example, based on the collected various types of information (step S4).

Next, the vehicle-mounted control device 101 transmits to the relay device 151 a setting change request indicating the calculated setting change content and timing information indicating the calculated setting change timing. Note that the vehicle-mounted control device 101 may also be configured to transmit the setting change timing together with the setting change request (step S5).

Next, the relay device 151 detects the arrival of the setting change timing indicated by the timing information received from the vehicle-mounted control device 101 (step S6), and performs setting change of the relay unit 22 and the like according to the setting change content indicated by the setting change request received from the vehicle-mounted control device 101 (step S7).

Next, the relay device 151 transmits a setting change response indicating that the setting change is complete, to the vehicle-mounted control device 101 (step S8).

As described above, with a configuration in which calculation information is periodically or irregularly acquired, for example, it is possible to understand changes in the required bandwidth due to software updates of the electronic devices 202 and the like by OTA, and a more appropriate setting change timing can be calculated.

Note that there is no limitation to a configuration in which each electronic device 202 and the relay device 151 autonomously transmit the calculation information to the vehicle-mounted control device 101, and the vehicle-mounted control device 101 may also request the calculation information from each electronic device 202 and the relay device 151 and acquire the calculation information transmitted as a response to the request.

Figure 6:
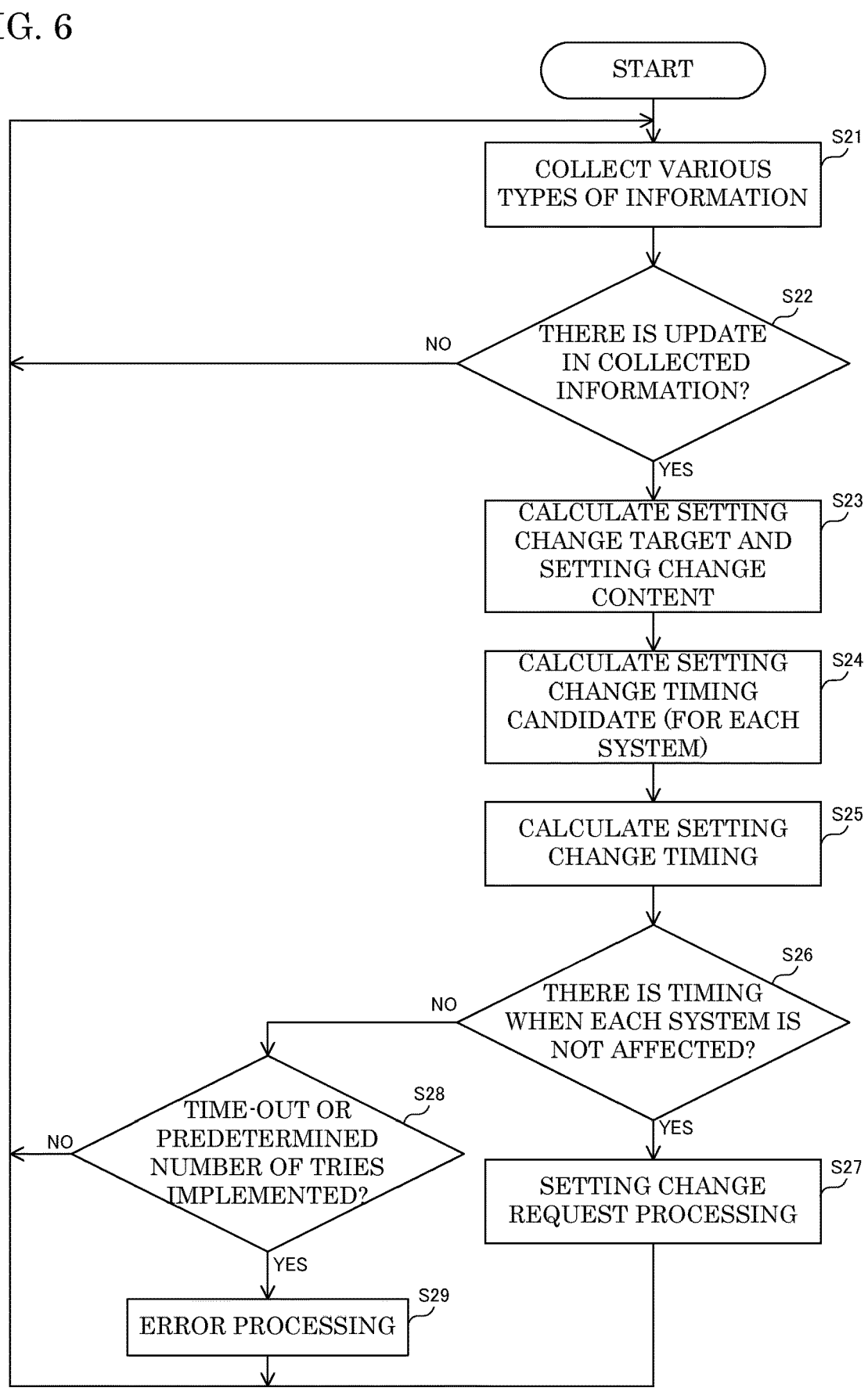
FIG. 6 is a flowchart that provides an example of an operation procedure when the vehicle-mounted control device according to the embodiment of the present disclosure performs setting change request processing.

FIG. 6 is a flowchart that provides an example of an operation procedure when the vehicle-mounted control device according to the embodiment of the present disclosure performs setting change request processing.

The calculation unit 13 calculates a timing when a setting change is possible for each of systems that provide different services, including the system that is the setting change target, and calculates setting change timings based on the calculated timings.

More specifically, the calculation unit 13 calculates the setting change timing by comprehensively determining a timing when a function or a service of the system that is the setting change target in the vehicle-mounted network can be stopped, a timing when a function or a service of a system other than the system that is the setting change target in the vehicle-mounted network is not affected, and a timing when there is a band margin of a predetermined value or more in the vehicle-mounted network.

Also, as the setting change request processing, the control unit 14 transmits a setting change request including the setting change timing to an electronic device in the vehicle-mounted network, such as the relay device 151.

Specifically, with reference to FIG. 6, first, the vehicle-mounted control device 101 collects service information, topology information, calculation information, and the like, which are periodically or irregularly transmitted from each electronic device 202 and the relay device 151 (step S21), confirms the content of the various types of collected information (hereinafter also referred to as collected information), and if the content has not been updated, awaits the arrival of new information (NO in step S22).

Then, if the content of the collected information has been updated (YES in step S22), the vehicle-mounted control device 101 calculates the communication port 21 of the relay device 151 that is the setting change target, and the like, and the setting change content, based on, for example, the content of the latest collected information (step S23).

Next, the vehicle-mounted control device 101 calculates the setting change timing for each system, for example, the period that satisfies the conditions shown in the condition table, as candidates, based on the latest calculation information and the condition table, for example (step S24).

Next, the vehicle-mounted control device 101 calculates the setting change timing based on each candidate setting change timing and the setting change target. For example, the vehicle-mounted control device 101 calculates a timing obtained by performing an AND operation on the timing when a function or a service of the system corresponding to the communication port 21 that is the setting change target can be stopped, and the timing when a function or a service of the system corresponding to the non-target communication port 21 is not affected, as the setting change timing. Specifically, for example, the vehicle-mounted control device 101 calculates a timing such as a period during which both the ADAS condition and the IVI system condition shown in the condition table are satisfied, as the setting change timing (step S25).

Next, if there is a timing resulting from the AND operation, that is, if there is a timing when each system is not affected (YES in step S26), the vehicle-mounted control device 101 performs setting change request processing for performing at least one of transmission of the setting change request and the timing information to the relay device 151 and a setting change of the relay processing of the vehicle-mounted control device 101 (step S27).

On the other hand, if there is no timing when each system is not affected as a result of the AND operation (NO in step S26), and if there is no time-out (NO in step S28), the vehicle-mounted control device 101 continues collection of new information (step S21).

On the other hand, if a time-out has occurred (YES in step S28), the vehicle-mounted control device 101 performs error processing such as displaying a warning (step S29).

Note that as a condition for error processing, the vehicle-mounted control device 101 may continue collecting new information if a predetermined number of tries have not been implemented (NO in step S28), and may perform error processing if a predetermined number of tries have been implemented (YES in step S28).

Figure 7:
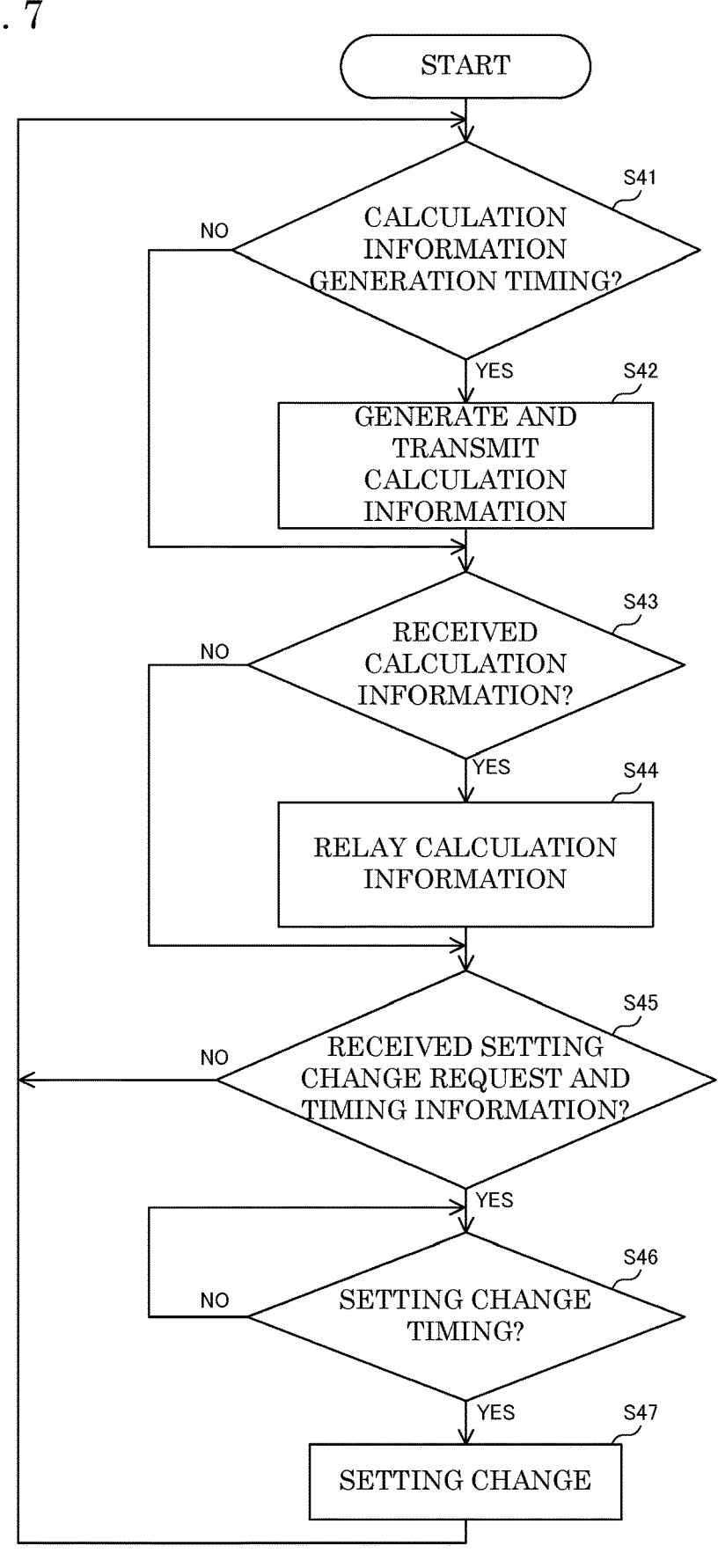
FIG. 7 is a flowchart that provides an example of an operation procedure when the relay device according to the embodiment of the present disclosure changes settings.

FIG. 7 is a flowchart that provides an example of an operation procedure when the relay device according to the embodiment of the present disclosure changes settings.

The processing unit 24 in the relay device 151 detects the arrival of the setting change timing included in the setting change request and performs a setting change.

Specifically, with reference to FIG. 7, the relay device 151 waits for the arrival of a calculation information generation timing (NO in step S41), waits for reception of calculation information from the electronic devices 202 (NO in step S43), and waits for reception of a setting change request and timing information from the vehicle-mounted control device 101 (NO in step S45).

Then, if the generation timing of the calculation information has arrived (YES in step S41), the relay device 151 generates the calculation information and transmits the generated calculation information to the vehicle-mounted control device 101 (step S42).

Also, if the relay device 151 has received the calculation information from the electronic devices 202 (YES in step S43), the relay device 151 transmits the received calculation information to the vehicle-mounted control device 101 (step S44).

Also, if the relay device 151 has received the setting change request and the timing information from the vehicle-mounted control device 101 (YES in step S45), the relay device 151 waits for the arrival of the setting change timing indicated by the timing information (NO in step S46), and if the setting change timing has arrived (YES in step S46), the relay device 151 performs a setting change of the relay unit 22 and the like according to the setting change content indicated by the setting change request (step S47).

Figure 8:
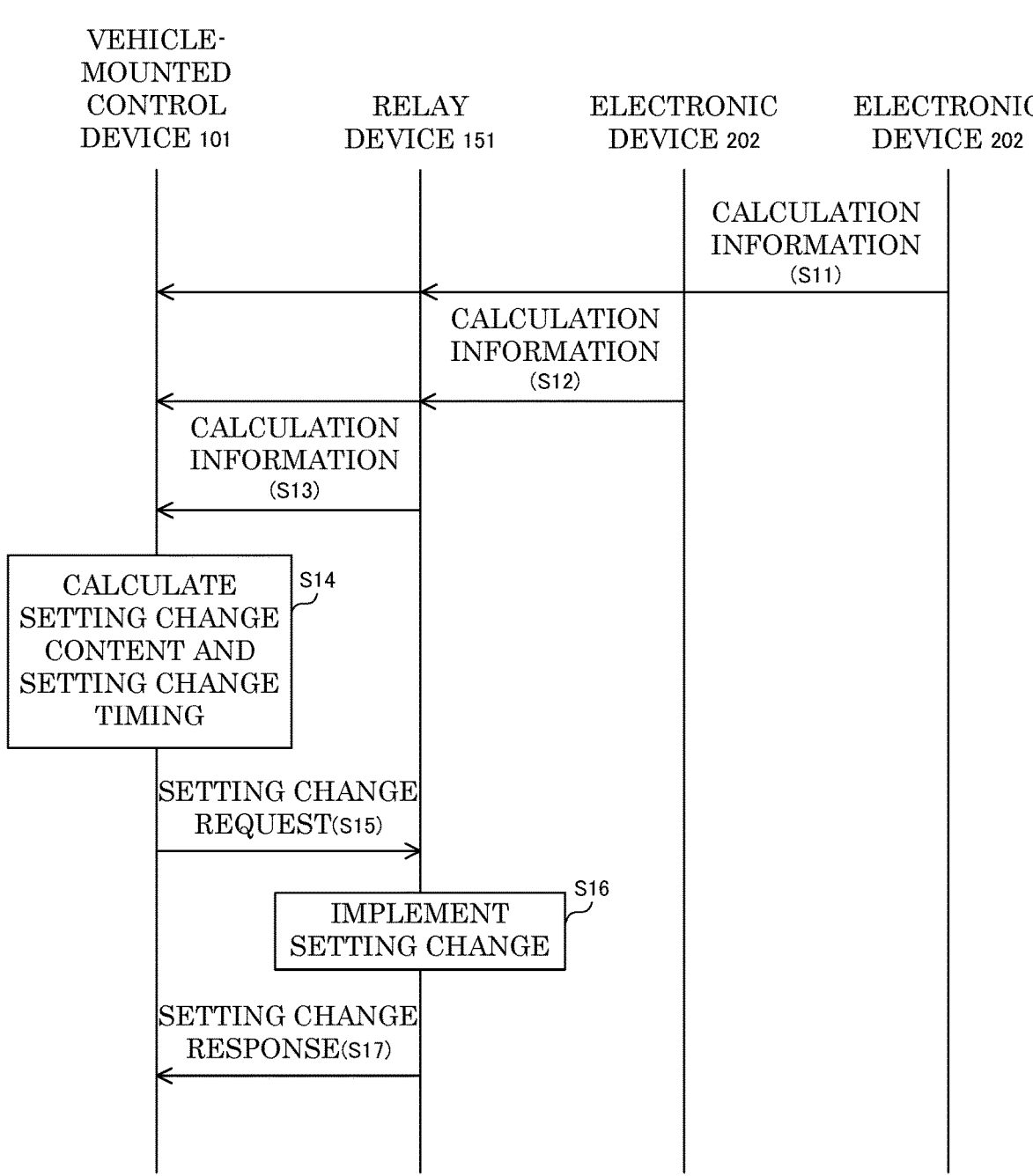
FIG. 8 is a diagram showing another example of the sequence of setting change processing in the vehicle-mounted communication system according to the embodiment of the present disclosure.

FIG. 8 is a diagram showing another example of the sequence of setting change processing in the vehicle-mounted communication system according to the embodiment of the present disclosure. FIG. 8 shows a case where two electronic devices 202 are connected to one relay device 151.

With reference to FIG. 8, the operations of steps S11 to S14 are the same as the operations of steps S1 to S4 shown in FIG. 5.

Next, when the calculated setting change timing arrives, the vehicle-mounted control device 101 transmits a setting change request indicating the calculated setting change content to the relay device 151 (step S15).

Next, in response to receiving the setting change request from the vehicle-mounted control device 101, the relay device 151 performs a setting change of the relay unit 22 and the like according to the received setting change content (step S16).

Next, the relay device 151 transmits a setting change response indicating that the setting change is complete to the vehicle-mounted control device 101 (step S17).

Figure 9:
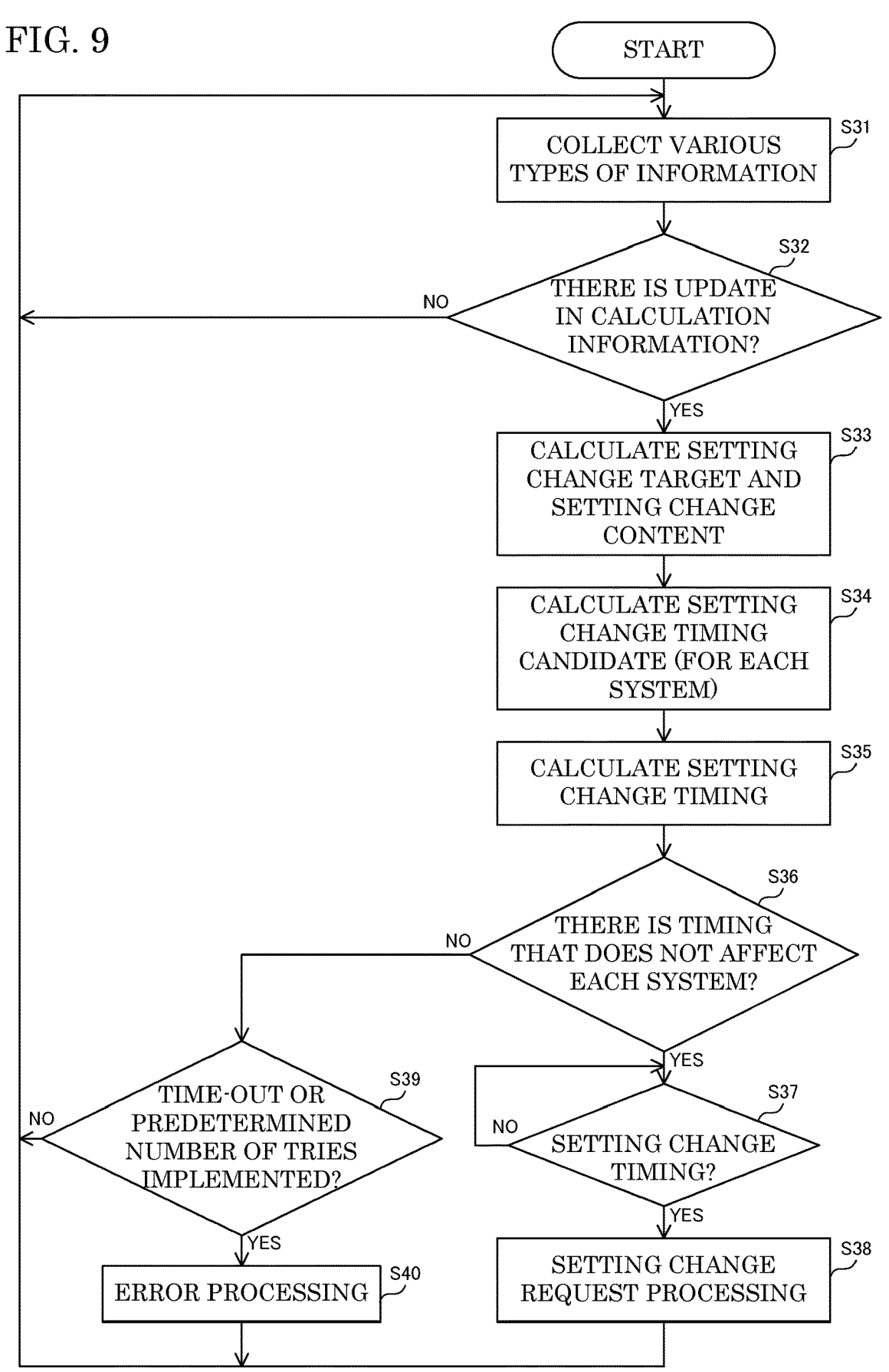
FIG. 9 is a flowchart that provides another example of the operation procedure when the vehicle-mounted control device according to the embodiment of the present disclosure performs setting change request processing.

FIG. 9 is a flowchart that provides another example of the operation procedure when the vehicle-mounted control device according to the embodiment of the present disclosure performs setting change request processing.

Specifically, with reference to FIG. 9, the operations of steps S31 to S36 are the same as the operations of steps S21 to S26 shown in FIG. 6.

Next, if there is a timing resulting from the AND operation, that is, if there is a timing when each system is not affected (YES in step S36), the vehicle-mounted control device 101 waits for the arrival of the setting change timing (NO in step S37), and if the setting change timing has arrived (YES in step S37), the vehicle-mounted control device 101 performs setting change request processing for performing at least one of transmission of the setting change request to the relay device 151 and a setting change of the relay processing of the vehicle-mounted control device 101 (step S38).

The operations of steps S39 and S40 are the same as the operations of steps S28 and S29 shown in FIG. 6.

Figure 10:
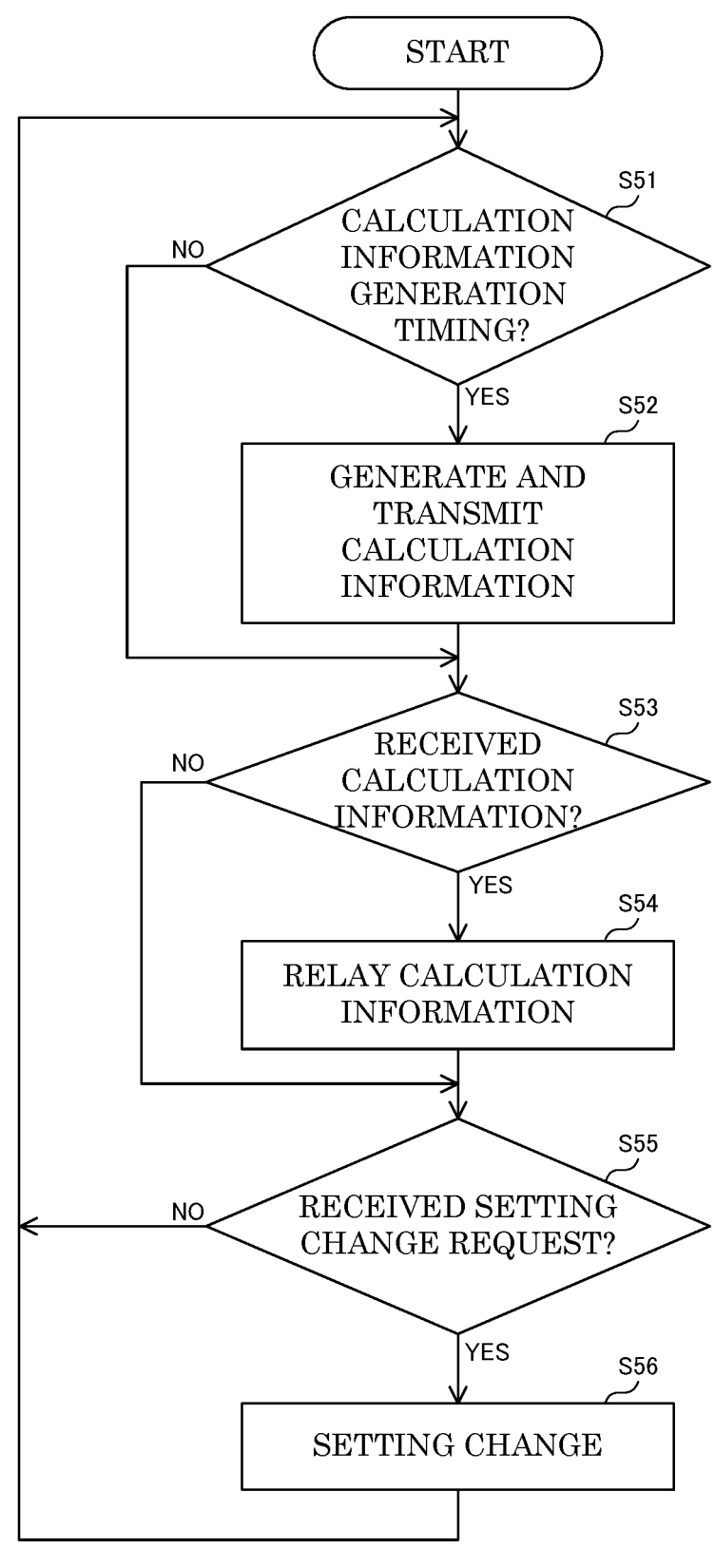
FIG. 10 is a flowchart that provides another example of the operation procedure when the relay device according to the embodiment of the present disclosure performs a setting change.

FIG. 10 is a flowchart that provides another example of the operation procedure when the relay device according to the embodiment of the present disclosure performs a setting change.

The processing unit 24 performs a setting change in response to receiving a setting change request that does not include the setting change timing.

Specifically, with reference to FIG. 10, the operations of steps S51 to S54 are the same as the operations of steps S41 to S44 shown in FIG. 7.

In response to receiving the setting change request from the vehicle-mounted control device 101 (YES in step S55), the relay device 151 performs a setting change of the relay unit 22 and the like according to setting change content indicated by the setting change request (step S56).

Note that in the vehicle-mounted communication system according to the embodiment of the present disclosure, the calculation unit 13 in the vehicle-mounted control device 101 is configured to calculate the timing at which the setting can be changed for each of systems that provide different services, but there is no limitation to this. The calculation unit 13 may also be configured to calculate a setting change timing that satisfies a permission condition of only one system, for example, a system other than the setting change target. Also, the vehicle-mounted communication system 301 may have a configuration in which only one type of system is provided.

Also, in the vehicle-mounted communication system according to the embodiment of the present disclosure, the calculation unit 13 in the vehicle-mounted control device 101 is configured to calculate the setting change content and the setting change timing of the relay device 151 or the vehicle-mounted control device 101, but there is no limitation to this. The calculation unit 13 may also be configured to calculate the setting change content and the setting change timing of the electronic device 202, for example. Also, the vehicle-mounted communication system 301 may have a configuration in which the relay device 151 is not provided.

Also, in the vehicle-mounted communication system according to the embodiment of the present disclosure, a configuration was used in which the topology information, the service information, and the calculation information are dynamically, that is, periodically or irregularly, provided to the vehicle-mounted control device 101, but there is no limitation to this. A configuration may also be used in which some or all of the topology information, the service information, and the calculation information are statically provided, such as being registered in the vehicle-mounted control device 101 in advance at the time of shipment of the vehicle 1.

By the way, when dynamically performing a setting change of a vehicle-mounted network, the setting change may affect communication in the vehicle-mounted network, depending on the environment of the vehicle and the like.

Specifically, software updates using OTA (Over The Air) and dynamic network setting changes associated with the addition of new electronic devices to vehicle-mounted networks and the like have been attracting attention.

Depending on the environment, it may be necessary to temporarily block communication when performing a dynamic setting change of a network. For example, if the systems to which the plurality of electronic devices 202 directly connected to the relay device 151 belong are different from each other as described above, there is a possibility that communication disconnection will occur in a system that is not a setting change target, depending on the setting change timing.

In a system that simply has a function of dynamically performing a setting change of a network, for example, when high-priority communication is being performed or the communication load is high due to automatic driving being in progress, it is not possible to properly determine whether or not a setting change of the network is to be implemented.

Also, if there is a change in the system configuration accompanying software updates using OTA (Over The Air), the addition of a new electronic device to the vehicle-mounted network, or the like, the system cannot determine how much bandwidth is required for the network setting change.

On the other hand, in the vehicle-mounted control device according to the embodiment of the present disclosure, the relay unit 12 acquires calculation information used for calculating the setting change timing of the vehicle-mounted network from the electronic device 202 in the vehicle-mounted network. The calculation unit 13 calculates the setting change timing based on the calculation information acquired by the relay unit 12. The control unit 14 performs setting change request processing for implementing a setting change of the vehicle-mounted network at the setting change timing calculated by the calculation unit 13.

Also, in the device setting method according to the embodiment of the present disclosure, the vehicle-mounted control device 101 first acquires calculation information used for calculating the setting change timing of the vehicle-mounted network from the electronic device 202 in the vehicle-mounted network. Next, the setting change timing is calculated based on the acquired calculation information. Next, setting change request processing for executing a setting change of the vehicle-mounted network is performed at the calculated setting change timing.

Such a configuration makes it possible to calculate an appropriate setting change timing using the calculation information acquired from the electronic device in the vehicle-mounted network, and therefore, when dynamically performing a setting change of the vehicle-mounted network, it is possible to reduce the likelihood that a setting change will affect communication in the in-vehicle network, with consideration given to high priority communication and the communication load. Accordingly, in a configuration in which a setting change of the vehicle-mounted network is possible, stable communication can be realized in the vehicle-mounted network.

Also, in the relay device according to the embodiment of the present disclosure, the relay unit 22 relays information between the electronic devices 202 in the vehicle-mounted network. The relay unit 22 acquires from the electronic devices 202 or generates calculation information used for calculating the setting change timing of the vehicle-mounted network, and transmits the calculation information to another device that calculates the setting change timing. The processing unit 24 receives a setting change request based on the setting change timing from the other device.

Also, in the device setting method according to the embodiment of the present disclosure, the relay device 151 first acquires from the electronic devices 202 or generates calculation information used for calculating the setting change timing of the vehicle-mounted network, and transmits the calculation information to another device that calculates the setting change timing. Next, the relay device 151 receives a setting change request based on the setting change timing from the other device, and performs a setting change of the relay unit 22 according to the received setting change request.

Such a configuration makes it possible to calculate an appropriate setting change timing using the calculation information acquired from the electronic device in the vehicle-mounted network, and therefore, when dynamically performing a setting change of the vehicle-mounted network, it is possible to reduce the likelihood that a setting change will affect communication in the in-vehicle network, with consideration given to high priority communication and the communication load. Also, it is possible to determine more appropriate setting change content and a more appropriate setting change timing for relay processing that greatly affects communication in the vehicle-mounted network, and to realize smoother communication before and after a setting change in the vehicle-mounted network. Accordingly, in a configuration in which a setting change of the vehicle-mounted network is possible, stable communication can be realized in the vehicle-mounted network.

The foregoing embodiments are to be construed in all respects as illustrative and not restrictive. The scope of the present disclosure is defined by the claims rather than the description above, and is intended to include all modifications within the meaning and scope of the claims and equivalents thereof.

The above description includes the features appended below.

A vehicle-mounted control device to be mounted in a vehicle, including: an acquisition unit configured to acquire calculation information to be used to calculate a setting change timing of the vehicle-mounted network from an electronic device in a vehicle-mounted network; a calculation unit configured to calculate the setting change timing based on the calculation information acquired by the acquisition unit; and a control unit configured to perform processing for executing a setting change of the vehicle-mounted network at the setting change timing calculated by the calculation unit, in which the calculation unit calculates setting change content and a setting change timing based on at least the calculation information, the control unit performs processing for executing the setting change according to the setting change content at the setting change timing, the calculation unit calculates the setting change timing by comprehensively determining a timing when a function or a service of a system that is a setting change target in the vehicle-mounted network can be stopped, a timing when a function or a service of a system other than the system that is a setting change target in the vehicle-mounted network is not affected, and a timing when there is a band margin of a predetermined value or more in the vehicle-mounted network, and as the processing, the control unit transmits a setting change request including the setting change timing to an electronic device in the vehicle-mounted network, or transmits a setting change request not including the setting change timing to an electronic device in the vehicle-mounted network at the setting change timing.

An Ethernet switch to be mounted in a vehicle, including a relay unit configured to relay information between electronic devices in a vehicle-mounted network, in which the relay unit acquires from an electronic device among the electronic devices or generates calculation information to be used to calculate a setting change timing of the vehicle-mounted network, and transmits the calculation information to another device that calculates the setting change timing, the Ethernet switch further includes a setting unit configured to receive a setting change request based on the setting change timing from the other device and perform a setting change of the relay unit according to the received setting change request, and the setting unit performs the setting change upon detecting arrival of the setting change timing included in the setting change request, or performs the setting change in response to receiving the setting change request that does not include the setting change timing.

A vehicle-mounted communication system to be mounted in a vehicle, including: an Ethernet switch configured to relay information between electronic devices in a vehicle-mounted network; and a vehicle-mounted control device, in which the Ethernet switch receives from an electronic device among the electronic devices or generates calculation information to be used to calculate a setting change timing of the vehicle-mounted network, and transmits the calculation information to the vehicle-mounted control device, and the vehicle-mounted control device receives the calculation information and transmits a setting change request based on the setting change timing to the Ethernet switch.

The invention claimed is:

1. A vehicle-mounted control device to be mounted in a vehicle and configured to connect a plurality of systems providing different services, the vehicle-mounted control device comprising:

an acquisition unit configured to acquire calculation information to be used to calculate a setting change timing of a vehicle-mounted network from an electronic device in the vehicle-mounted network;

a calculation unit configured to calculate the setting change timing based on the calculation information acquired by the acquisition unit; and a control unit configured to perform processing for executing a setting change of the vehicle-mounted network at the setting change timing calculated by the calculation unit, wherein the calculation unit calculates the setting change timing based further on at least one of a timing when a function or service of a system of plurality of systems that is a setting change target in the vehicle-mounted network can be stopped, a timing when a function or service of any system of the plurality of systems other than the system that is the setting change target in the vehicle-mounted network is not affected, and a timing when there is a band margin of a predetermined value or more in the vehicle-mounted network, the calculation information includes at least one of a topology of the vehicle-mounted network, a service of the system of the plurality of systems to which the electronic device belongs, a travel state of the vehicle, and a power supply state of the vehicle, and the calculation unit calculates a timing at which a setting change is possible for each of the systems of the plurality of systems that provide different services, including the system that is the setting change target, and calculates the setting change timing based on each of the calculated timings.

2. The vehicle-mounted control device according to claim 1, wherein the acquisition unit acquires the calculation information via a relay device configured to relay information between the electronic devices in the vehicle-mounted network, the calculation unit calculates setting change content of the relay device and the setting change timing of the relay device based on the calculation information, and as the processing, the control unit performs processing for reflecting the setting change content in the relay device at the setting change timing.

3. An Ethernet switch to be mounted in a vehicle, comprising:

a relay unit configured to relay information between electronic devices in a vehicle-mounted network, wherein the relay unit acquires from an electronic device among the electronic devices or generates calculation information to be used to calculate a setting change timing of the vehicle-mounted network, and transmits the calculation information to another device that calculates the setting change timing, the Ethernet switch further includes a setting unit configured to receive a setting change request based on the setting change timing from the other device and perform a setting change of the relay unit according to the received setting change request, and the calculation information includes at least one of a topology of the vehicle-mounted network, a service of a system to which the electronic device belongs, a travel state of the vehicle, and a power supply state of the vehicle.

4. A device setting method in a vehicle-mounted control device to be mounted in a vehicle, the vehicle-mounted control device configured to connect a plurality of systems providing different services, the method comprising:

a step of acquiring calculation information to be used to calculate a setting change timing of a vehicle-mounted network from an electronic device in the vehicle-mounted network;

a step of calculating the setting change timing based on the acquired calculation information; and a step of performing processing for executing a setting change of the vehicle-mounted network at the calculated setting change timing, wherein in the step of calculating the setting change timing, the setting change timing is calculated based further on at least one of a timing when a function or service of a system of the plurality of systems that is a setting change target in the vehicle-mounted network can be stopped, a timing when a function or a service of any system of the plurality of systems other than the system that is the setting change target in the vehicle-mounted network is not affected, and a timing when there is a band margin of a predetermined value or more in the vehicle-mounted network, the calculation information includes at least one of a topology of the vehicle-mounted network, a service of the system of the plurality of systems to which the electronic device belongs, a travel state of the vehicle, and a power supply state of the vehicle, and in the step of calculating the setting change timing, a timing at which a setting change is possible is calculated for each of the systems of the plurality of systems that provide different services, including the system that is the setting change target, and the setting change timing is calculated based on each of the calculated timings.

5. A device setting method for an Ethernet switch to be mounted in a vehicle and including a relay unit configured to relay information between electronic devices in a vehicle-mounted network, comprising:

a step of acquiring from an electronic device among the electronic devices or generating calculation information to be used to calculate the setting change timing of the vehicle-mounted network and transmitting the calculation information to another device that calculates the setting change timing; and a step of receiving a setting change request based on the setting change timing from the other device, and performing a setting change of the relay unit according to the received setting change request, wherein the calculation information includes at least one of a topology of the vehicle-mounted network, a service of a system to which the electronic device belongs, a travel state of the vehicle, and a power supply state of the vehicle.

* * * * *